Feb. 3, 1959     J. L. BARTLETT, JR., ET AL     2,871,671
CONTROLS FOR AN AIR CONDITIONING SYSTEM
Filed May 28, 1956     2 Sheets-Sheet 1

JAMES L. BARTLETT, JR.,
HEBER T. HERTZOG,
ROBERT M. PICKARD,
           INVENTORS.

BY     JOHN H. G. WALLACE.

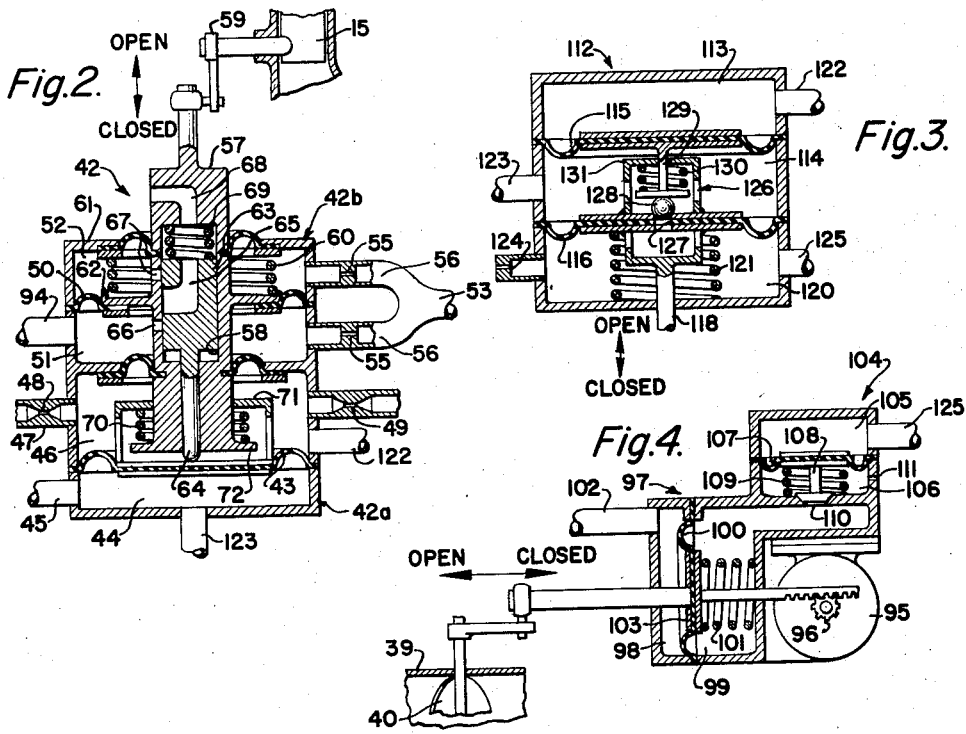
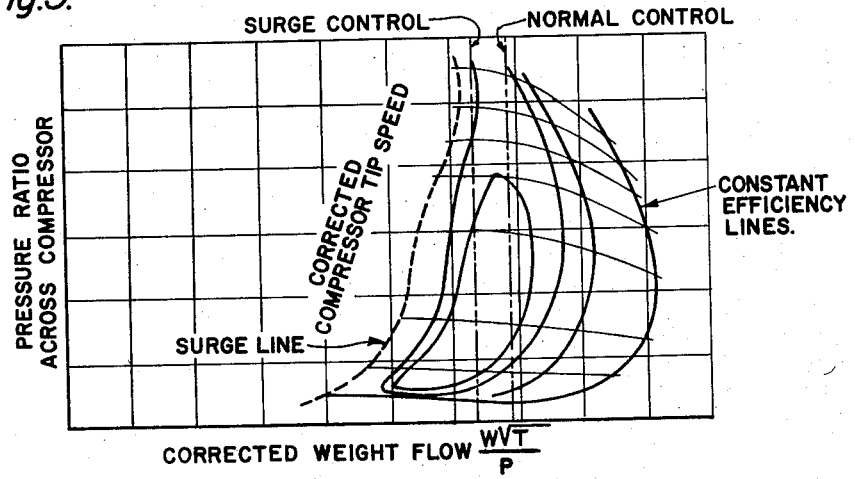

United States Patent Office 2,871,671
Patented Feb. 3, 1959

2,871,671

CONTROLS FOR AN AIR CONDITIONING SYSTEM

James L. Bartlett, Jr., Rolling Hills, Calif., Heber T. Hertzog, Phoenix, Ariz., and Robert M. Pickard, Hermosa Beach, Calif., assignors to The Garrett Corporation, Los Angeles, Calif., a corporation of California Application May 28, 1956, Serial No. 587,527

15 Claims. (Cl. 62—172)

This invention relates generally to controls for air conditioning systems and more especially to the controls associated with a turbocompressor which is utilized to supply compressed air for an air cycle air conditioning and pressurization system.

The term turbocompressor as used herein defines a device in which a turbine supplies power to drive a compressor.

It is conventional in aircraft air-cycle air conditioning systems now in use to bleed compressed air from the engine air compressor, condition it in the air conditioning system, and transmit it to the aircraft cabin. When the compressor of a turbojet engine is utilized as the source of compressed air for the air conditioning system there is danger that contaminated air produced in the operation of the engine may be transmitted into the cabin.

The danger of introducing contaminated air into the cabin may be overcome by utilizing the compressor unit of a turbocompressor to supply only fresh ram air for the air conditioning system and the cabin. In such a system the high pressure air bled from the compressor of the turbojet engine is utilized only to drive the turbine and is then dumped overboard.

It has been found, however, that to obtain optimum performance and efficiency in an air-cycle air conditioning system in which a turbocompressor is utilized to supply compressed fresh ram air for the system, it is required that the turbine-driven compressor be prevented from surging. It is therefore a major object of the invention to provide controls in an air conditioning system of the class described that automatically act to prevent surge of the compressor unit of the turbocompressor by maintaining compressor operation within safe limits.

In carrying out the main object of the invention it is a further object of the invention to provide, in an air conditioning system in which a turbocompressor is utilized to supply the compressed air for the system, primary control means that maintains a substantially constant weight of air flow from the compressor unit and secondary control means that prevents surge by dumping a portion of the compressor discharge flow when the air conditioning system air demand is too low and the primary control is negated.

It is a still further object of the invention to provide a pressure ratio control that automatically overrides the aforementioned primary control of the turbocompressor to limit maximum pressure ratio across the compressor unit to an altitude schedule.

It is still a further object of the invention to provide controls for an air conditioning system in which a turbocompressor is utilized to supply the compressed air for the system, that automatically adjust the flow characteristics of the air conditioning system to those of the turbocompressor flow schedule.

It is another object of the invention to provide controls for the turbocompressor that are basically independent of the temperature controls of the air conditioning system.

Other and further objects of the invention will become apparent from the following description of a preferred form of the invention taken in conjunction with the accompanying drawings wherein:

Fig. 2 is an enlarged view, partly in section, of a variable area nozzle actuator schematically illustrated in Fig. 1;

Fig. 3 is an enlarged view, partly in section, of a surge bleed valve actuator schematically shown in Fig. 1;

Figure 1:
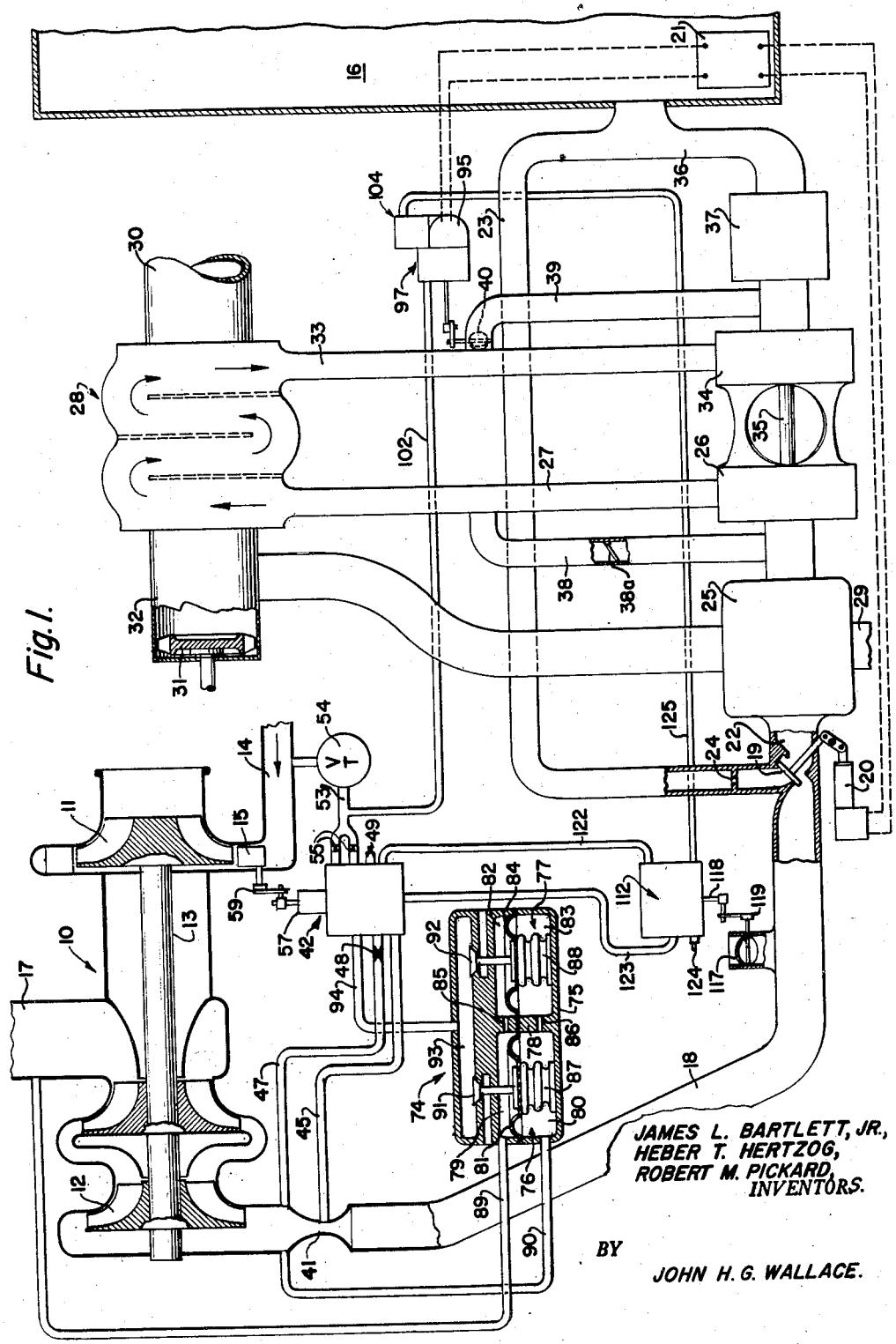
Fig. 1 is a schematic representation of an air conditioning system utilizing a turbocompressor to supply the compressed air for the system and including the controls embodying the features of this invention.

Fig. 4 is an enlarged view, partly in section, of a turbine by-pass valve schematically illustrated in Fig. 1; and Fig. 5 is a performance chart for the compressor unit of the turbocompressor forming part of the system of Fig. 1, with the pressure ratio across the compressor plotted against the weight flow of the compressor, and on which are shown a "surge line" and two control operating lines, one being termed a "normal control" line and the other a "surge control" line.

Referring now to the drawings, the controls embodying the features of the invention are shown installed in an air conditioning system which is supplied with air under pressure by a turbocompressor shown generally at 10. The turbocompressor is composed of two major units, a turbine 11 and a compressor 12, joined by a connecting shaft 13. High pressure air to drive the turbine 11 is derived from the main aircraft jet engine or other source (not shown) and is conveyed to the turbine through duct 14 and a variable area nozzle 15 which for purposes of illustration is shown as being of the movable nozzle vane type. The air which ultimately is supplied to an aircraft cabin 16 is fresh ambient ram air which flows into inlet duct 17 and is pumped through the air conditioning system to the cabin by compressor 12.

The compressor 12 and the means to condition the discharge air are connected by a duct 18. A thermal by-pass valve 19 variably positioned by actuator 20 under control of a compartment temperature controller 21, which may be of the type disclosed and claimed in the Brown et al. application for Electronic Temperature Control filed November 20, 1952, Serial No. 321,656, is located at the junction of duct 18 with a primary heat exchanger duct 22 and a heating by-pass duct 23. An orifice 24 in the heating by-pass duct 23 serves the purpose of imposing a back pressure on the turbocompressor during low altitude operation to increase the temperature of the compressor discharge air.

Assuming that the by-pass duct 23 is closed by the valve 19, the air from the compressor 12 is directed through the duct 22 and a primary heat exchanger 25 to a secondary or "bootstrap" compressor 26, so-called in the art because the turbine which drives the compressor is downstream of the latter. The compressed air from the secondary compressor is then delivered through a duct 27 to a secondary heat exchanger 28.

A suitable coolant medium, which is illustrated as comprising ambient ram air, is supplied through ram ducts 29 and 30 to the heat exchangers 25 and 28. An auxiliary pumping means, such as a fan 31, is provided in a coolant air discharge duct 32 for augmenting coolant air flow during times of low-ram pressure such as during taxing of the aircraft, or when the aircraft is sitting on the ground. The fan 31 may be driven by electrical or pneumatic means (not shown) and may be actuated in conjunction with the landing gear extension and retraction in any of the manners well known in the art.

The cooled air from the secondary heat exchanger 28 is conducted through a duct 33 to an energy converting means, which in this instance consists of an expansion turbine 34, by which energy of the conditioning air is converted into mechanical energy and the conditioning air is further cooled by expansion prior to its being delivered to the enclosure or cabin 16. This recovered power is delivered to a driving shaft 35 operatively connected with the bootstrap compressor 26. From the expansion turbine 34 the cooled air is conducted to the cabin 16 through a duct 36. A water separator 37 of a type well known in the art is placed in the duct 36 to remove a portion of the entrained moisture which may be present in the turbine discharge air due to the reduction of the air temperature. The heating by-pass duct 23 joins duct 36 at its inlet into cabin 16.

The bootstrap compressor 26 has a connection between its inlet and outlet sides forming a by-pass 38 in which is located a check valve 38a that permits air flow around the bootstrap compressor when the bootstrap is inoperative, thereby providing a circuit of less resistance than that of a windmilling bootstrap compressor.

The expansion turbine 34 likewise has its inlet and outlet interconnected by a duct 39 which forms a by-pass therearound, flow through this by-pass being controlled by a valve 40 which is normally actuated in response to signals from the temperature controller 21. The valve 40 is controlled in sequence with the thermal by-pass valve 19 so that when the turbine by-pass valve 40 is actuated to the maximum open position, and still more heating is desired, the thermal by-pass valve 19 is moved in a direction to open the port leading to the heating by-pass duct 23 and close the port leading to the primary heat exchanger duct 22.

The turbocompressor controls embodying the features of this invention tend to prevent surge by maintaining compressor operation between the "normal control" line and the "surge control" line of Fig. 5. The primary control means that function to maintain compressor operation on the "normal control" line communicates with a flow control venturi 41 located in duct 18 adjacent the discharge of the compressor 12 and includes a variable area nozzle actuator 42 operatively connected to the turbine variable area nozzle 15. As shown in Fig. 2, the actuator 42 comprises a servo section 42a and a power section 42b. The servo section 42a is divided by a flexible diaphragm 43 into a chamber 44 which is connected through duct 45 with the throat of the venturi 41 and a chamber 46 which is connected through duct 47 with the inlet section of the venturi 41. A converging-diverging nozzle 48 is inserted in duct 47 adjacent the inlet to chamber 46 while a second converging-diverging nozzle 49 forms an outlet from chamber 46.

The power section 42b of the actuator 42 is divided by a flexible diaphragm 50 into a chamber 51 and a chamber 52, the two chambers being connected through duct 53 to a source of high pressure air, such as bleed air in duct 14. The pressure in duct 53 is regulated by a spring loaded throttling valve 54 of a type well known to the art. Flow into chambers 51 and 52 is restricted by two metering orifices 55 installed in the dual passages 56 of the duct 53.

A body member 57 having an inner chamber 58 is operably attached at its upper end by suitable linkage 59 to the variable area nozzle 15 and at an intermediate portion to the diaphragm 50. The diaphragm 50 is spring loaded and set to fail with the variable area nozzle vanes closed by means of a spring 60 which bears between the housing 61 of the actuator 42 and a flange 62 of the body member 57.

A valve member 63 having a stem 64 which protrudes through the body member 57 into operative engagement with the diaphragm 43 is slidably mounted within the inner chamber 58. The valve member 63 is provided with a passage 65 which freely communicates at one end with the inner chamber 58 and at its opposite end adjoins the face of the inner chamber 58. The passage 65 at the latter end is of a width slightly less than the axial distance between the adjacent sides of ports 66 and 67 which are located in the wall surrounding the inner chamber 58 and communicate respectively with chambers 51 and 52. When, therefore, the valve 63 is in an intermediate position both the ports 66 and 67 will be cut off from communication with the passage 65, but slight movement of the valve in either direction will cause the passage to come into communication with one or the other of the ports and cause air to flow through the uncovered port, the passage 65, chamber 58 and a passage 68 to a region of lower pressure which may be the ambient atmosphere.

A spring 69 located in chamber 58 tends to urge the valve member 63 downwardly to retain the stem 64 in engagement with the diaphragm 43. A spring 70 bearing between a member 71, which is operatively attached to the diaphragm 43, and a flange 72 formed on the body member 57, tend to urge the diaphragm 43 upwardly and retain the diaphragm in engagement with the stem 64.

In operation, when the compressor unit flow is operating on the "normal control" line of Fig. 5 and the compressor discharge flow tends to decrease there will be a resultant decrease in the pressure differential across the venturi 41 which will be sensed by the diaphragm 43 as an unbalanced force tending to move the diaphragm and the servo-follower valve member 63 upwardly as viewed in Fig. 2. Upward movement of the valve member 63 uncovers the port 67 and high pressure air in chamber 52 is bled to a region of lower pressure by way of port 67, passage 65, chamber 58 and passage 68. The resultant unbalance in force across the diaphragm 50 is transmitted, in step with the pressure differentials, through the member 57 to the linkage 59 and the variable area nozzle 15 to move the nozzle vanes in the opening direction and thereby increase the flow of high pressure bleed air to the turbine 11. The turbine power thus is augmented and the speed of the compressor increased as required to meet the particular operating pressure ratio imposed. Conversely, if the compressor discharge flow tends to increase the pressure differential across the venturi 41 will increase and the small correction signal fed from the venturi to the nozzle actuator servo 42a will initiate a power function by the nozzle actuator power section 42b to move the variable area nozzle 15 in the closing direction to reduce the turbine power output and decrease the speed of the compressor as required to meet the particular operating pressure ratio imposed.

Thus, the nozzle actuator servo functions as a sensor. The sensor function is accomplished by using the two converging-diverging nozzles 48 and 49 in series to establish a reference pressure in one of the control head chambers, which for illustration is shown as chamber 46. Weight flow through each of the converging-diverging nozzles is independent of downstream conditions, and by properly selecting or adjusting their relative nozzle areas, the ratio of upstream pressure to chamber pressure is a constant. The pressure in chamber 44 acts as the error sensing reference pressure. The control regulates compressor speed to maintain a constant $\Delta P/P$ (ratio of venturi $\Delta P$ divided by absolute pressure P) between upstream and throat pressure of the venturi. This defines a constant compressor discharge flow factor $W\sqrt{T}/P$ from the compressor (i. e. constant compressor weight flow control where: W is compressor air flow, P is compressor discharge pressure, and T is compressor discharge temperature), as $\Delta P/P$ is linearly proportional to $W\sqrt{T}/P$ at the compressor discharge, and it satisfies the characteristic vertical line appearing on Fig. 5 as a "normal control" line. Thus, by maintaining a constant $\Delta P/P$, the compressor operation will operate substantially on the "normal control" line, the operation position on this line depending on the system demands. Since the general trend of the "normal control" line is parallel to the surge line of the compressor, the control is surge-preventative.

If desired in order to maintain optimum performance the compressor may be controlled not in accordance with a straight line, but along a desired curve. In this case each valve of the pressure ratio is correlated to a predetermined value of the corrected weight flow.

In order to limit the maximum pressure ratio of the compressor 12 in accordance with an altitude schedule a dual pressure ratio limiter is installed in the system. The dual pressure ratio limiter, as indicated at 74, comprises a housing 75 having a compartment 76 and a compartment 77 separated by a wall 78. The compartment 76 is divided into a chamber 79 and a chamber 80 by a flexible diaphragm 81, and the compartment 77 is divided into a chamber 82 and a chamber 83 by a flexible diaphragm 84. An aperture 85 is provided in the upper portion of the wall 78 to permit air to flow freely between chambers 79 and 82, and similarly an aperture 86 is provided in the lower portion of the wall 78 to permit air to flow freely between chambers 80 and 83. An evacuated aneroid bellows 87 in chamber 80 and an evacuated aneroid bellows 88 in chamber 83, each fixed at one end to the housing 75, are respectively attached at their free ends to diaphragm 81 and to diaphragm 84.

A dual pressure ratio schedule with altitude is provided by installing aneroids of different force constants in chambers 80 and 83. For example, the aneroid 87 in chamber 80 may be regulated to limit the pressure ratio of the compressor 12 to one preset schedule from 0 to 45,000 feet altitude while the aneroid 88 in chamber 83 is inoperative, and the aneroid 88 may be regulated to limit the pressure ratio of the compressor to a different preset schedule in the 45,000 to 55,000 foot altitude range while the aneroid 87 is inoperative.

One side of each of the diaphragms 81 and 84 is subjected to compressor inlet pressure which is ducted to the chamber 79 and 82 through a duct 89 which connects chamber 79 with the inlet duct 17 of the compressor 12. The other side of each of the diaphragms 81 and 84 and the exteriors of the bellows 87 and 88 are subjected to compressor discharge pressure which is ducted to the chambers 80 and 83 through a duct 90 which connects chamber 80 with the duct 18 at the discharge of the compressor 12. The respective areas of diaphragms and bellows exposed to the pressures in the chambers on opposite sides of the diaphragms 81 and 84 are so proportioned that when the preset compressor pressure ratio is not exceeded the poppet valve 91 attached to the bellows 87, and the poppet valve 92 attached to the bellows 88, remain on their seats in chamber 93. When, however, the preset compressor pressure ratio is exceeded, the poppet valve 91, or the poppet valve 92, is raised from its seat in chamber 93, and air is permitted to flow from this chamber to a region of lower pressure, such as ambient atmosphere.

Chamber 93 of the pressure ratio limiter 74 and chamber 51 of the variable area nozzle actuator 42 are interconnected by a duct 94 so that an adjustment of the pressure in chamber 93, due to actuation of the poppet valve 91 or of the poppet valve 92 of the pressure ratio limiter, will produce a corresponding adjustment of the pressure in chamber 51. When, therefore, the preset compressor ratio tends to be exceeded, the pressure ratio limiter will function to override the venturi flow control signal by unseating poppet valve 91 or 92 and decreasing the pressure in chamber 51 of the power section 42b of actuator 42. This will result in an unbalanced pressure condition across the diaphragm 50 to move the diaphragm and the attached body member 57 downwardly and actuate the variable area nozzle 15 toward its closed position to decrease compressor discharge flow and thereby prevent the preset pressure ratio of the compressor from being exceeded.

When the compressor unit flow is operating on the "normal control" line of Fig. 5 and the air conditioning system is operating under a demand for maximum cooling, the expansion turbine by-pass valve 40 is actuated by the reversible electric motor 95 (Fig. 4) through suitable gearing 96 in response to signals from the compartment temperature controller 21 to maintain the desired preset cabin temperature. When, however, the maximum allowable compressor pressure ratio tends to be exceeded, the compressor operation tends to shift toward the "surge control" line shown on Fig. 5 and the turbine by-pass valve 40 is moved toward the open position by a turbine by-pass valve actuator shown schematically at 97 which pneumatically overrides the electric motor 95.

The turbine by-pass valve actuator 97, as shown in detail in Fig. 4, has a pneumatic power section consisting of a chamber 98 and a chamber 99 separated by a flexible diaphragm 100 which is loaded by a spring 101 so as to fail with the valve 40 open. The chamber 98 is pressurized with turbine bleed pressure through a duct 102 which, for convenience, may branch off the high pressure duct 53 carrying air of regulated pressure, as shown in Fig. 1. The chambers 98 and 99 are interconnected by a bleed orifice 103 located in the diaphragm 100.

A pneumatic relay operatively associated with the pneumatic power section is shown generally at 104 and comprises a chamber 105 and a chamber 106 separated by a flexible diaphragm 107. A valve member 108 operatively connected to the diaphragm 107 and normally held in the open position by a spring 109 controls a port 110 interconnecting chambers 99 and 106. The chamber 106 is vented to ambient atmosphere through the orifice 111 and therefore, when the valve member 108 is in the open position, the chamber 99 is also vented to atmosphere.

The turbine by-pass valve actuator 97 is controlled in sequence with a surge bleed valve actuator shown schematically at 112. The surge bleed valve actuator 112, as shown in detail in Fig. 3, has an upper chamber 113 and a middle chamber 114 separated by a flexible diaphragm 115. A second flexible diaphragm 116, operatively connected to a surge bleed valve 117 (Fig. 1) through a rod 118 and suitable gearing 119, separates the middle chamber 114 and a lower chamber 120. The diaphragm 116 is loaded by a spring 121 to fail with the surge bleed valve 117 open.

The established reference pressure in chamber 46 of the nozzle actuator servo 42a is conducted through a duct 122 to the upper chamber 113. Venturi throat pressure from chamber 44 of the nozzle actuator servo is fed to the middle chamber 114 through a duct 123. The lower chamber 120 has a vent 124 to ambient atmosphere and additionally is operatively connected through duct 125 to the chamber 105 of the pneumatic relay 104.

A metering valve assembly shown generally at 126 is mounted on diaphragm 116 to control flow of air from chamber 114 to chamber 120 and comprises an aperture 127 in the diaphragm 116 and a ball member 128 which operatively seats on the aperture 127. The ball member 128 is mounted on the lower end of a flanged rod 129 which is operatively attached at its upper end to the diaphragm 115 so that the modulation of the valve 126 depends on the relative positions of the two diaphragms 115 and 116. A spring 130 bearing between a member 131 which is operatively attached to the diaphragm 116, and the flange on the lower end of the rod 128, tends to apply a load to the diaphragm 115 and to normally hold the ball member 128 seated on the aperture 127.

When the compressor unit 12 is operating on the "normal control" line of Fig. 5 in the manner described above, the force of the spring 130 will hold valve member 128 on the aperture 127 and thereby prevent the relatively high pressure air in chamber 114 from flowing through the aperture 127 into chamber 120. Due to the vent 124, the pressure at this time in chamber 120, duct 125 and chamber 105 is substantially ambient atmospheric pressure. Since, due to the orifice 111, the pressure in chamber 106 is also ambient atmospheric pressure, the valve member 108 accordingly is held in the open position by the spring 109 and the air in chamber 99 is vented to ambient atmosphere through port 110, chamber 106 and orifice 111. The high pressure air in chamber 98 acting on the left side of diaphragm 100 against the force of spring 101 and ambient pressure in chamber 99 on the opposite side of the diaphragm tends to hold the valve 40 in the closed position, but the valve 40 may be modulated toward open position by the electric motor 95 acting in response to signals from the compartment temperature controller 21.

When the maximum allowable compressor pressure ratio tends to be exceeded, the pressure ratio limiter 74 functions to decrease compressor flow in the manner described above, the primary control is negated and the compressor operating point shifts leftward from the "normal control" line toward the "surge line" shown on Fig. 5. The decrease in the compressor discharge flow will result in an increase in the pressure differential across the venturi 41 which is sensed by the diaphragm 115 of the surge bleed actuator 112 as an unbalance force tending to move diaphragm 115 upwardly, as shown in Fig. 3, and open the valve 126. When the compressor operating point has shifted leftward to the "surge control" line of Fig. 5, the pressure differential across the diaphragm 115 will be sufficient to overcome the force of the spring 130 and modulate valve 126 to maintain compressor operation substantially on the "surge control" line. When the ball member 128 of the valve 126 is unseated, high pressure air flows from chamber 114 through the aperture 127 into chamber 120. The increased pressure in chamber 120 is transmitted through duct 125 to chamber 105 of the pneumatic relay 104 and actuates the valve member 108 in the closing direction to block the port 110 and stop the flow of air from chamber 99 to atmosphere. Due to the continued flow of air from chamber 98 through orifice 103 into chamber 99, the air pressure on opposite sides of the diaphragm 100 tends to become equalized and the control of the by-pass valve 40 by the electric motor 95 is overridden by the force of the spring 101 acting on the right hand side of the diaphragm 100 to move the valve to the open position. Movement of the turbine by-pass valve into its open position tends to adjust refrigeration system flow characteristics to those of the compressor 12 by lessening system resistance to air flow.

If the flow that will pass through the system at maximum limit pressure ratio with the turbine by-pass valve 40 fully open is still below that which will satisfy surge bleed control demands, the diaphragm 115 will still be acted upon by an unbalanced force that holds valve 126 in the open position and continues to build up pressure in the chamber 120. With the turbine by-pass valve fixed in the open position, this increased pressure in chamber 120 augmented by the force of spring 121 will move diaphragm 116 in the upwardly direction to open the surge bleed valve 117 and spill overboard a portion of the air flowing in duct 18. Modulating the surge bleed valve 117 open further decreases the resistance of the circuit, relieving back pressure, and permitting a higher air flow, thus preventing compressor surge. As compressor air flow reaches the proper value to satisfy surge bleed demands, the deviation of the pressure differential across the venturi will decrease until the system is stabilized with a portion of the compressor delivery flow passing through the refrigeration system to the aircraft cabin and a portion being spilled overboard.

For severe transients or sudden partial duct constrictions, large instantaneous venturi throat pressure changes will move the metering valve 126 to a wide open position and cause both the turbine by-pass valve 40 and the surge bleed valve 117 to open simultaneously. If the flow constriction persists, the valve will stabilize for steady-state operation with minimum opening of the surge bleed valve.

Control operation with a deficiency of engine bleed air energy at the turbine 11 will shift the point of compressor operation to the left of the "normal control" line shown on Fig. 5, and the control operation will be identical to the above except that the turbocompressor speed is lower, with the exact speed dictated by the power balance between turbine power output and compressor power requirements.

What is claimed is:

1. In an air conditioning system adapted for connection to a source of high pressure air: a turbocompressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure, including a cooling turbine, a by-pass duct around said cooling turbine, and a by-pass valve located in said by-pass duct and normally controlled by a temperature controller in response to enclosure temperature variations; means for sensing compressor discharge flow in said compressor outlet; primary control means associated with said sensing means for normally maintaining a substantially constant weight discharge flow from the compressor; and secondary control means for preventing surge of said compressor, said secondary control means including an actuator associated with said sensing means for overriding said temperature controller to open said turbine by-pass valve when compressor discharge flow decreases to a predetermined value below said constant weight discharge flow.

2. In an air conditioning system adapted for connection to a source of high pressure air: a turbo-compressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure, including a cooling turbine, a by-pass duct around said cooling turbine, and a by-pass valve located in said by-pass duct and normally controlled by a temperature controller in response to enclosure temperature variations; means for sensing compressor discharge flow in said compressor outlet; a surge bleed valve in said compressor discharge air conducting means upstream of said air conditioning means; primary control means associated with said sensing means for normally maintaining a substantially constant weight discharge flow from the compressor; and secondary control means associated with said sensing means for preventing surge of said compressor, said secondary control means including a turbine by-pass valve actuator for overriding said temperature controller to open said turbine by-pass valve, and a surge bleed valve actuator for modulating said surge bleed valve to bleed a portion of said compressor discharge air from the system, said turbine by-pass valve actuator and said surge bleed valve actuator operating in sequence when compressor discharge flow decreases to a predetermined value below said constant weight discharge flow.

3. In an air conditioning system adapted for connection to a source of high pressure air: a turbo-compressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; means for sensing compressor discharge flow in said compressor outlet; and control means associated with said sensing means, including primary control means for maintaining a substantially constant weight discharge flow from the compressor, ratio control means for overriding said primary control means to limit maximum pressure ratio across the compressor in accordance with an altitude schedule, and secondary control means for preventing surge by relieving back pressure of the compressor when the primary control means is overridden.

4. In an air conditioning system adapted for connection to a source of high pressure air: a turbo-compressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; means for sensing compressor discharge flow in said compressor outlet; a variable area nozzle for admitting said high pressure air to said turbine; an actuator responsive to changes sensed in said compressor discharge flow for modulating the area of said variable area nozzle to regulate delivery of said high pressure air to said turbine to maintain a substantially constant weight discharge flow from the compressor; ratio control means for overriding the response of said actuator to changes in said compressor discharge flow to limit maximum pressure ratio across the compressor in accordance with an altitude schedule; and control means for preventing surge by relieving back pressure of the compressor when the response of the actuator to changes in said compressor discharge flow is overridden.

5. In an air conditioning system adapted for connection to a source of high pressure air: a turbo-compressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; a flow control venturi located in said discharge air conducting means adjacent said compressor outlet; a variable area nozzle for admitting said high pressure air to said turbine; an actuator comprising a servo section for responding to pressure changes in said flow control venturi and a power section for modulating the area of said variable area nozzle in accordance with the change in pressures in said servo section to regulate delivery of said high pressure air to said turbine to maintain a substantially constant weight discharge flow from the compressor; ratio control means for overriding the response of said actuator to pressure changes in said flow control venturi to limit maximum pressure ratio across the compressor in accordance with an altitude schedule; and control means for preventing surge by relieving back pressure of the compressor when the response of said actuator to pressure changes in said flow control venturi is overridden.

6. In an air conditioning system adapted for connection to a source of high pressure air: a turbocompressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; a flow control venturi located in said discharge air conducting means adjacent said compressor outlet; a variable area nozzle for admitting said high pressure air to said turbine; actuating means for modulating the area of said variable nozzle in accordance with pressure changes in said flow control venturi to regulate delivery of said high pressure air to said turbine to maintain a substantially constant weight discharge flow from the compressor, said actuating means including a servo section having a pair of chambers communicating with the inlet and throat section of said flow control venturi, one of said chambers being adapted to provide a reference pressure, and a power section adapted to be actuated by said servo section and operatively connected to said variable area nozzle; ratio control means communicating with said power section and adapted to override the response of said actuating means to pressure changes in said flow control venturi to limit maximum pressure ratio across the compressor in accordance with an altitude schedule; and control means for preventing surge by relieving back pressure of the compressor when the response of said actuating means to pressure changes in said flow control venturi is overridden.

7. In an air conditioning system adapted for connection to a source of high pressure air: a turbocompressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure, including a cooling turbine, a by-pass duct around said cooling turbine, and a by-pass valve located in said by-pass duct and normally controlled by a temperature controller in response to enclosure temperature variations; a flow control venturi located in said discharge air conducting means adjacent said compressor outlet; a surge bleed valve in said compressor discharge air conditioning means upstream of said air conditioning means; a variable area nozzle for admitting said high pressure air to said turbine; actuating means for modulating the area of said variable area nozzle in accordance with pressure changes in said flow control venturi to regulate delivery of said high pressure air to said turbine to maintain a substantially constant weight discharge flow from the compressor; ratio control means for overriding the response of said actuator to changes in said compressor discharge flow to limit maximum pressure ratio across the compressor in accordance with an altitude schedule; and surge control means associated with said flow control venturi for preventing surge of said compressor, said surge control means including a turbine by-pass valve actuator for overriding said temperature controller to open said turbine by-pass valve, and a surge bleed valve actuator for modulating said surge bleed valve to bleed a portion of said compressor discharge air from the system, said turbine by-pass valve actuator and said surge bleed valve actuator operating in sequence when compressor discharge flow decreases to a predetermined value below said constant weight discharge flow.

8. In a turbocompressor, the combination of: a turbine; a compressor arranged to be driven by said turbine and having a compressed air outlet; means for sensing compressor discharge flow in said compressor outlet; primary control means associated with said sensing means, including a variable area nozzle disposed to control flow through said turbine, for normally maintaining a substantially constant weight discharge flow from the compressor; conduit means for conducting discharge air from said compressor outlet to a point of use; a surge bleed valve in said conduit means; and secondary control means associated with said sensing means for preventing surge of said compressor, said secondary control means including a surge bleed valve actuator for modulating said surge bleed valve to bleed a portion of said compressor discharge flow from the conduit means when the compressor discharge flow decreases to a predetermined value below said constant weight discharge flow.

9. In a turbocompressor, the combination of: a turbine; a compressor arranged to be driven by said turbine and having a compressed air outlet; conduit means for conducting discharge air from said compressor outlet to a point of use; a flow control venturi located in said conduit means adjacent said compressor outlet; a variable area nozzle disposed to control flow through said turbine; actuating means for modulating the area of said variable area nozzle in accordance with pressure changes in said flow control venturi to regulate said turbine to maintain a substantially constant weight discharge flow from the compressor, said actuating means including a servo section having a pair of chambers communicating with the inlet and throat section of said flow control venturi, one of said chambers being adapted to provide a reference pressure, and a power section adapted to be actuated by said servo section and operatively connected to said variable area nozzle; a surge bleed valve in said conduit means; and secondary control means associated with said sensing means for preventing surge of said compressor, said secondary control means including a surge bleed valve actuator for modulating said surge bleed valve to bleed a portion of said compressor discharge flow from the conduit means when the compressor discharge flow decreases to a predetermined value below said constant weight discharge flow.

10. In a turbocompressor, the combination of: a turbine; a compressor arranged to be driven by said turbine; means for sensing compressor discharge flow; and control means associated with said sensing means, including primary control means for maintaining a substantially constant weight discharge flow from the compressor, ratio control means for overriding said primary control means to limit maximum pressure ratio across the compressor in accordance with an altitude schedule, and secondary control means for preventing surge by relieving back pressure of the compressor when the primary control means is overridden.

11. In a turbocompressor, the combination of: a turbine; a compressor arranged to be driven by said turbine and having a compressed air outlet; conduit means for conducting discharge air from said compressor outlet to a point of use; a flow control venturi located in said conduit means adjacent said compressor outlet; a variable area nozzle disposed to control flow through said turbine; actuating means for modulating the area of said variable area nozzle in accordance with pressure changes in said flow control venturi to regulate said turbine to maintain a substantially constant weight discharge flow from the compressor, said actuating means including a servo section having a pair of chambers communicating with the inlet and throat section of said flow control venturi, one of said chambers being adapted to provide a reference pressure, and a power section adapted to be actuated by said servo section and operatively connected to said variable area nozzle; ratio control means communicating with said power section and adapted to override the response of said actuating means to pressure changes in said flow control venturi to limit maximum pressure ratio across the compressor in accordance with an altitude schedule; a surge bleed valve in said conduit means; and secondary control means associated with said sensing means for preventing surge of said compressor, said secondary control means including a surge bleed valve actuator for modulating said surge bleed valve to bleed a portion of said compressor discharge flow from the conduit means when the compressor discharge flow decreases to a predetermined value below said constant weight discharge flow.

12. In an air conditioning system adapted for connection to a source of high pressure air: a turbocompressor comprising a turbine arranged to be driven by said high pressure air and a compressor driven by said turbine and having an inlet for air to be conditioned and a compressed air outlet; conduit means for conducting discharge air from said compressor outlet to an enclosure; means for conditioning said discharge air prior to delivery to said enclosure; means for sensing compressor discharge flow in said compressor outlet; primary control means associated with said sensing means, including a variable area nozzle disposed to control flow through said turbine, for normally maintaining a substantially constant weight discharge flow from the compressor; a surge bleed valve in said conduit means; and secondary control means associated with said sensing means for preventing surge of said compressor, said secondary control means including a surge bleed valve actuator for modulating said surge bleed valve to bleed a portion of said compressor discharge flow from the conduit means when the compressor discharge flow decreases to a predetermined value below said constant weight discharge flow.

13. In an air conditioning system adapted for connection to a source of high pressure air: a turbocompressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; a by-pass duct around said conditioning means; a by-pass valve located in said by-pass duct and normally controlled by a temperature controller in response to enclosure temperature variations; means for sensing compressor discharge flow in said compressor outlet; and control means including an actuator associated with said sensing means for overriding said temperature controller to open said by-pass valve when compressor discharge flow decreases to a predetermined value.

14. In an air conditioning system adapted for connection to a source of high pressure air: a turbocompressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; a by-pass duct around said conditioning means; a by-pass valve located in said by-pass duct and normally controlled by a temperature controller in response to enclosure temperature variations; means for sensing compressor discharge flow in said compressor outlet; primary control means associated with said sensing means for normally maintaining a substantially constant weight discharge flow from the compressor; and secondary control means for preventing surge of said compressor, said secondary control means including an actuator associated with said sensing means for overriding said temperature controller to open said by-pass valve when compressor discharge flow decreases to a predetermined value below said constant weight discharge flow.

15. In an air conditioning system adapted for connection to a source of high pressure air: a turbocompressor comprising a turbine arranged to be driven by said high pressure air and a compressor driven by said turbine and having an inlet for air to be conditioned and a compressed air outlet; means for conducting discharge air from said compressor outlet to an enclosure; means for conditioning said discharge air prior to delivery to said enclosure; means for sensing compressor discharge flow in said compressor outlet; primary control means associated with said sensing means for normally maintaining a substantially constant weight discharge flow from the compressor; and ratio control means for overriding said primary control means to limit maximum pressure ratio across the compressor in accordance with an altitude schedule.

References Cited in the file of this patent

UNITED STATES PATENTS

| | | |
|---|---|---|
| 1,874,136 | Standerwick | Aug. 30, 1932 |
| 2,441,779 | Troeger | May 18, 1948 |
| 2,557,099 | Green | June 19, 1951 |